United States Patent [19]
Ibori et al.

[11] Patent Number: 5,465,202
[45] Date of Patent: Nov. 7, 1995

[54] INVERTER APPARATUS PROVIDED WITH ELECTRIC DISCHARGE CONTROL CIRCUIT OF DC SMOOTHING CAPACITOR AND METHOD OF CONTROLLING THE SAME

[75] Inventors: Satoshi Ibori, Funabashi; Hitoshi Yamashita, Yachiyo; Shigeyuki Baba, Narashino; Hiroshi Fujii, Chiba; Takatsugu Kambara, Funabashi; Akira Ishibashi, Tokyo, all of Japan

[73] Assignee: Hitachi, Ltd., Tokyo, Japan

[21] Appl. No.: 205,082

[22] Filed: Mar. 3, 1994

Related U.S. Application Data

[63] Continuation of Ser. No. 799,936, Nov. 29, 1991, abandoned.

[30] Foreign Application Priority Data

Nov. 30, 1990 [JP] Japan .................................. 2-329377

[51] Int. Cl.[6] .................................................. H02M 5/45
[52] U.S. Cl. ................................................ 363/37; 363/34
[58] Field of Search ................................. 363/34, 35, 37, 363/79, 80, 97, 98, 55, 56, 58; 361/18, 90, 91, 111; 318/798, 800, 801, 803

[56] References Cited

U.S. PATENT DOCUMENTS

| | | | |
|---|---|---|---|
| 4,331,994 | 5/1982 | Wirth | 361/56 |
| 4,843,533 | 6/1989 | Roof et al. | 363/55 |
| 5,127,085 | 6/1992 | Becker et al. | 388/903 |

*Primary Examiner*—Peter S. Wong
*Assistant Examiner*—Adolf Berhane
*Attorney, Agent, or Firm*—Antonelli, Terry, Stout & Kraus

[57] ABSTRACT

In a variable frequency power source unit, a series circuit of a contactless semiconductor switching element and a resistor is provided in parallel to a d.c. smoothing capacitor, and a control circuit is provided for receiving a signal for turning on the switching element selectively at any time after the power source is interrupted, thereby discharging the electric charge on the d.c. smoothing capacitor.

9 Claims, 7 Drawing Sheets

INVERTER APPARATUS PROVIDED WITH ELECTRIC DISCHARGE CONTROL CIRCUIT OF DC SMOOTHING CAPACITOR AND METHOD OF CONTROLLING THE SAME

This application is a continuation of application Ser. No. 07/799,936, filed Nov. 29, 1991, now abandoned.

BACKGROUND OF THE INVENTION

The present invention relates to an inverter apparatus, and more particularly to an inverter apparatus in which after disconnecting an a.c. power source, residual electric charge of a smoothing capacitor is discharged by turning on a semiconductor switching element at a desired time or after a lapse of an allowable duration of momentary power stoppage so that electrical shock by residual voltage may be prevented.

In general, an inverter apparatus is provided with a d.c. smoothing capacitor having a large electrostatic capacity, and a voltage remains on this smoothing capacitor for a long time after the input voltage is cut off unless special measures of discharge are taken.

Figure 8:
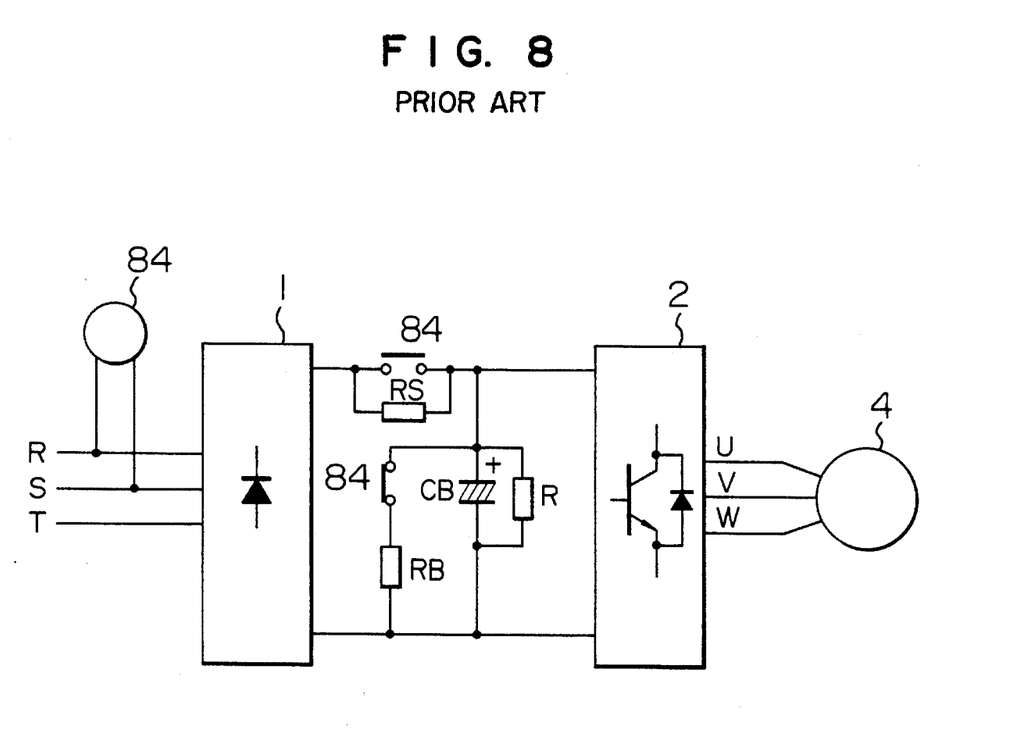
FIG. 8 is a diagram showing a conventional inverter apparatus.

Since a dangerous electrical shock may be encountered in touching the inside of an inverter apparatus at maintenance and the like, electric charge of the d.c. smoothing capacitor is discharged in a conventional inverter apparatus by devices as disclosed in JP-A-59-172984 (1984), JP-A-60-9396 (1985), JP-A-61-191299 (1986), JP-A-62-114492 (1987), and JP-A-64-8894 (1989). FIG. 8 shows an example of these prior arts, in which a contact b of an electromagnetic contactor 84 is closed when the a.c. input voltage is cut off, thereby absorb as heat energy the residual voltage of a smoothing capacitor CB through a resistor RB.

Any of the above-described prior art, however, is not arranged to immediately discharge the electric charge of the d.c. smoothing capacitor at any desired time, and hence it is impossible to immediately discharge the electric charge of the d.c. smoothing capacitor for the purpose of preventing a danger when some serious situation happens, for instance. Further, it is not necessarily recommendable to discharge the electric charge of the d.c. smoothing capacitor every time the power source is turned OFF, because it creates a problem that charge and discharge are repeated frequently in case the start-stop frequency is high, thus reducing the life of the d.c. smoothing capacitor, a contactor, a rush current preventing resistor and the like.

Further, in the above-described prior art, since the electric charge of the d.c. smoothing capacitor is discharged independently of the allowable duration of a momentary power stoppage, it creates a problem that there is a possibility of a large rush of current at a time of power restarting if the electric charge of the d.c. smoothing capacitor has been discharged, thereby destroying elements of a power rectifier.

SUMMARY OF THE INVENTION

It is an object of the present invention to provide an inverter apparatus in which the above-described problems are solved, electrical shock can be prevented, and reliability is high.

According to the present invention, a series circuit of a semiconductor switching element and a resistor is connected in parallel with a d.c. smoothing capacitor, and an input terminal for a control signal for turning on and off the switching element at a desired time through an ON/OFF control circuit is provided in order to achieve the above-described object. With this arrangement, the residual charge of the d.c. smoothing capacitor is discharged through the series circuit of the semiconductor switching element and the resistor.

The allowable duration of momentary power stoppage is selected usually at 10 ms to 50 ms, but may be substantially infinite sometimes as disclosed in U.S. Pat. No. Re. 33,519. On the other hand, many contactors, such as electromagnetic contactors' operate within 10 ms to 20 ms. Accordingly, it is required to be able to determine the timing of discharge based on the allowable duration time of power stoppage even when discharging by using a contactor or a semiconductor element.

Thus, a command for turning on the element is inputted after a lapse of the allowable duration time of momentary power stoppage after the a.c. input power source to the inverter apparatus is interrupted. A signal for turning on the semiconductor switching element is outputted from the ON/OFF control circuit in response to the above command. The residual electric charge of the d.c. smoothing capacitor is discharged similarly with the foregoing. Since the residual electric charge is not discharged within the allowable duration time of momentary power stoppage, a large rush of current does not flow when the power source is restarted within the allowable duration time.

DESCRIPTION OF THE PREFERRED EMBODIMENTS

An embodiment of the present invention will be described hereinafter with reference to FIG. 1.

Figure 1:
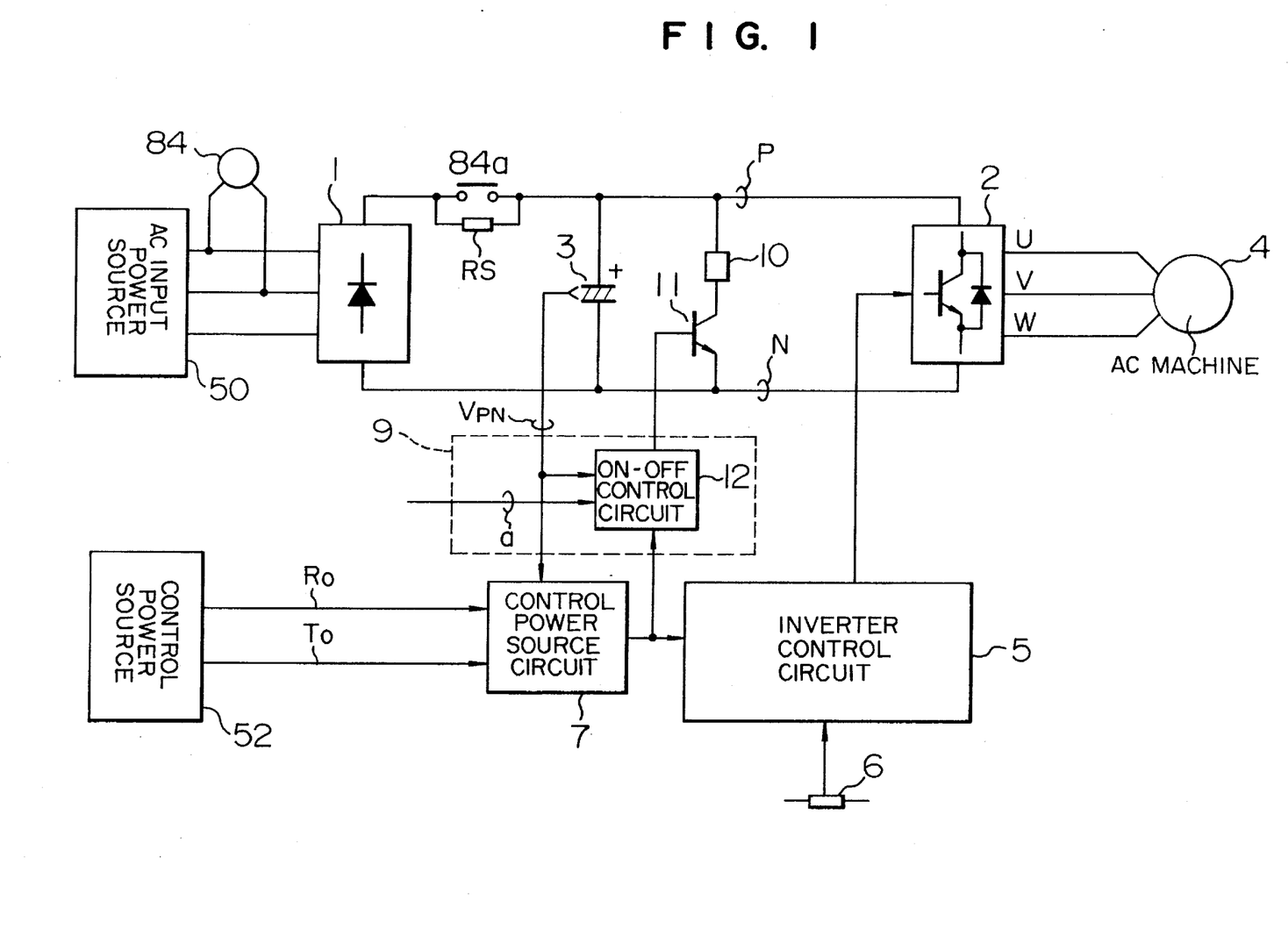
FIG. 1 is a circuit block diagram of an embodiment of the present invention.

FIG. 1 shows an inverter apparatus according to the present invention. Three-phase a.c. electric power is inputted to a rectifier 1 from connecting points R, S and T of the three-phase a.c. input power source 50 and the rectifier 1, and converted into d.c. electric power by means of the rectifier 1. This d.c. electric power is converted further into an a.c. electric power of variable voltage and variable frequency by means of an inverter 2. An a.c. machine 4 is connected to the output of the inverter 2, and the speed of the a.c. machine 4 is controlled variably. A smoothing capacitor 3 is disposed between the rectifier 1 and the inverter 2 for smoothing the d.c. voltage. When the a.c. electric power is applied at a start of the inverter apparatus, a rush of charging current flows in the smoothing capacitor 3. A resistor RS for restricting the rush charging current is provided between the rectifier 1 and the smoothing capacitor 3. During operation, the resistor RS is short-circuited by closing a normally-open contact 84a of an electromagnetic contactor 84.

A series circuit of a semiconductor switching element 11 and a resistor 10, which is connected in parallel with the smoothing capacitor 3 and primarily used as a circuit for regenerative braking of an a.c. motor, is used commonly as a discharge circuit for discharging electric charge of the smoothing capacitor 3 according to the present invention.

A reference numeral 9 denotes a discharge control circuit including an ON/OFF control circuit 12 for controlling a drive signal, which in turn controls ON/OFF switching of switching element 11 for discharging electric charge on the smoothing capacitor 3. A signal a for discharging electric charge on the smoothing capacitor 3 is inputted at a desired time to the discharge control circuit 9 so as to turn on the semiconductor switching element 11. The semiconductor switching element 11 is of a contractless type. When the signal a is inputted, the semiconductor switching element 11 is turned on, and the electric charge on the capacitor 3 is discharged through the switching element 11 and the resistor 10.

On the other hand, a speed command which determines the output frequency of the inverter apparatus is outputted from a frequency setter 6 and inputted to a control circuit 5 including a microcomputer. The control circuit 5 controls the inverter 2 in the pulse width modulation PWM mode (a generally well-known method of controlling a voltage with the pulse width) and drives the semiconductor switching elements of the inverter 2 so as to produce a.c. power of variable voltage and variable frequency.

Further, 7 denotes a control power source which receives a.c. electric power through terminals $R_0$ and $T_0$ and supplies voltage to control circuits of the whole apparatus. This a.c. electric power may be obtained from any two of the terminals R, S and T connected to the three-phase a.c. power source or from a separate power source.

Next, the operation of an embodiment according to the present invention will be described in more detail with reference to FIGS. 1 and 2.

When the a.c. power source connected to the terminals R, S and T is cut OFF, the energy of the smoothing capacitor of the d.c. intermediate circuit is absorbed by a switching regulator circuit 17, as disclosed, for example, in "Practical Electronic Circuits Hand Book" published by CQ Book Co. 1980, pp 274–284, through a path of a positive pole P of the smoothing capacitor 3 to a diode $D_1$, the switching regulator circuit 17, and a negative pole N of the smoothing capacitor 3. Since power consumption of the switching regulator circuit is small, however, the voltage of the smoothing capacitor 3 is substantially maintained for a long period of time. When a signal a for turning on or off the semiconductor switching element 11 independently of the OFF state of the a.c. power source is inputted under this state, the semiconductor switching element 11 is driven through a drive circuit 15. A manual signal generated by a push-button or the like may be used for the signal a.

Incidentally, the potential $V_{PN}$ of the d.c. intermediate circuit rises by regenerative energy at regenerative braking of the a.c. motor. When the potential reaches a predetermined reference value $V_{PN}^*$, higher than $V_{PN}$, an output signal d of a comparator 16 is inverted, thereby to turn on the semiconductor switching element 11 through the drive circuit 15.

In the embodiment shown in FIG. 1, a contractless semiconductor switching element is used instead of an electromagnetic contactor, in order to discharge the electric charge of the smoothing capacitor 3. Therefore, it is possible not only to provide a compact and highly reliable inverter apparatus, but also to discharge the electric charge at any time, if necessary. That is, a signal interlocked with a push-button or a door of a control board may be used as the signal a. Thus, since the electric charge of the smoothing capacitor 3 will not be discharged unnecessarily, there is also an advantage obtained in the life of the smoothing capacitor 3.

Figure 3:
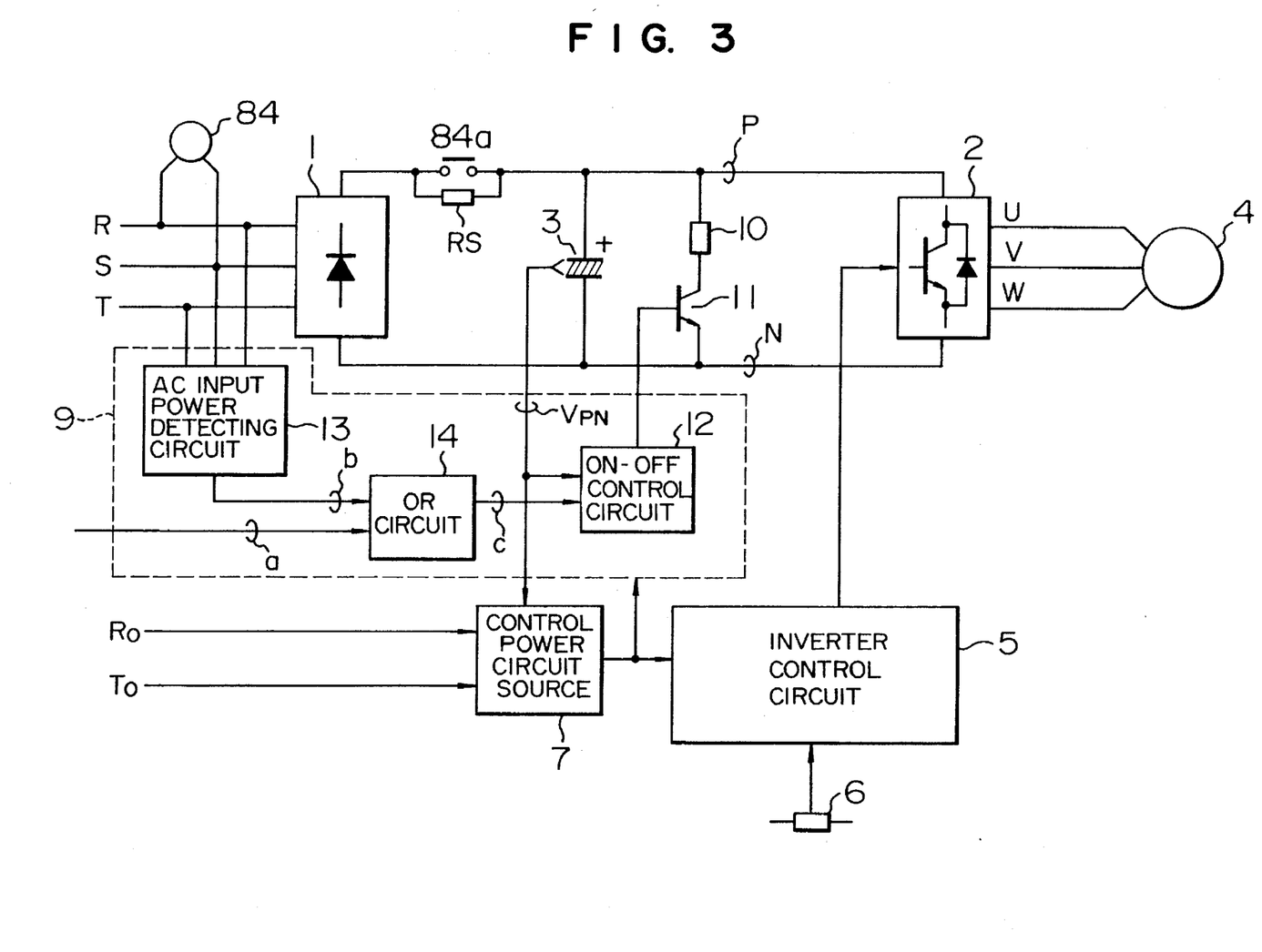
FIG. 3 is a circuit block diagram of another embodiment of the present invention.

FIG. 3 shows another embodiment of the present invention. This embodiment differs from the embodiment shown in FIG. 1 in that an a.c. input power detecting circuit 13 and an OR circuit 14 are provided in a control circuit 9. The a.c. input power detecting circuit 13 detects an ON/OFF state of the a.c. input power source and generates a signal b after a lapse of the allowable duration time of power stoppage following detection of the OFF state of the power source. Then, the OR circuit 14 outputs a signal c in response to either one of the signals a and b applied thereto. The signal a is the same as the signal a explained in the embodiment of FIG. 1 and may be a manual signal produced by a push-button, for example.

When the a.c. power source is interrupted, the signal b is generated after a lapse of the allowable duration time of power stoppage. This signal b is inputted to the ON/OFF control circuit 12 through the OR circuit 14, thereby turning on the semiconductor switching element 11. On the other hand, the signal a is inputted at any time in the same manner as that described with respect to the embodiment shown in FIG. 1, thereby turning on the semiconductor switching element 11.

Since the semiconductor switching element 11 is not turned on at a momentary power stoppage within the allowable duration time thereof, the residual voltage on the smoothing capacitor 3 is not consumed. Thus, a large rush of charging current does not flow into the smoothing capacitor 3 at restarting of the power source, so that the operation of the a.c. machine 4 is continued smoothly. On the other hand, when the momentary power stoppage continues longer than the allowable duration time, the semiconductor switching element 11 is turned on, and the residual voltage of the smoothing capacitor 3 is discharged. Incidentally, it is possible to achieve the object of the present invention using only the signal b, without using the signal a, but it is useful in view of safety to use the signal a also.

Figure 4:
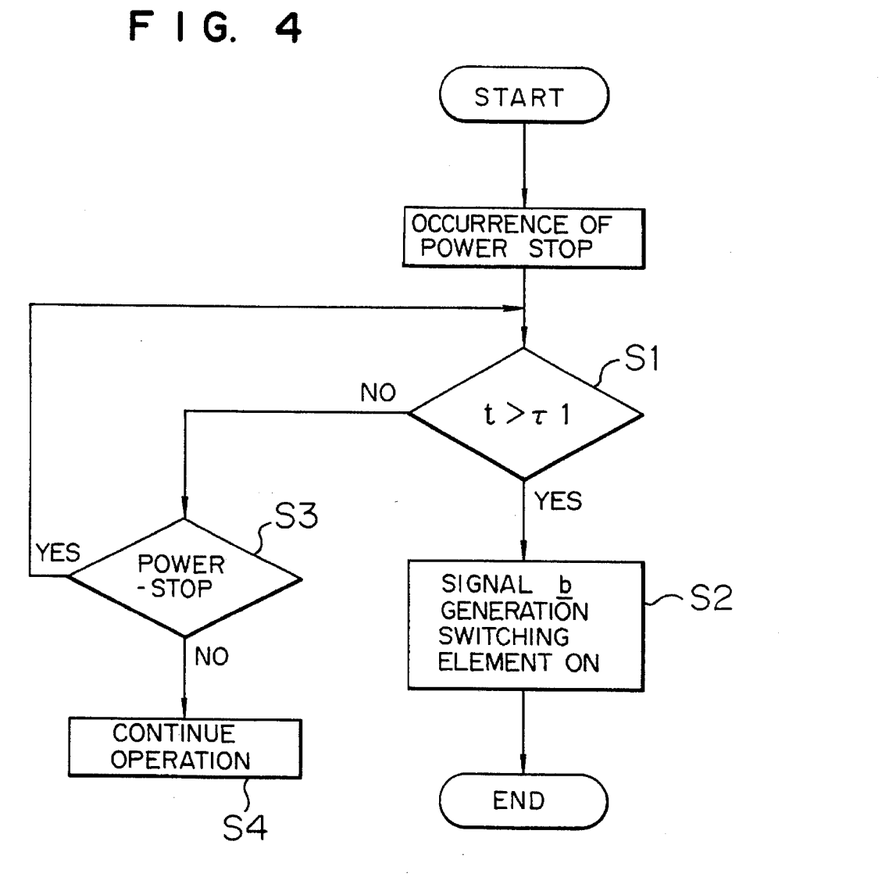
FIG. 4 shows a flow chart of a process by software at power stoppage according to the present invention.

The control blocks 5 and 9 may be constructed by hardware, or by software using a microcomputer. FIG. 4 shows a flow chart of a software process upon occurrence of a power stoppage. After the occurrence of a power stoppage, the time is measured in a step S1 so as to monitor whether the allowable duration time τ1, which is 10 ms to 50 ms in many cases as stated previously and may be 30 ms for instance, has elapsed or not, and the signal b is generated at a lapse of the time τ1, thereby turning on the semiconductor switching element 11 in a step S2. Until the allowable duration time τ1 elapses, whether the power stop continues or not is judged in a step S3. If the power stop terminates, the operation of the system is continued (step S4).

It is necessary to utilize a control power source after the a.c. input power source is turned off. Since it is impossible to turn on the semiconductor switching element 11 unless a control power source is maintained without failure. This matter will be explained hereinafter.

Figure 2:
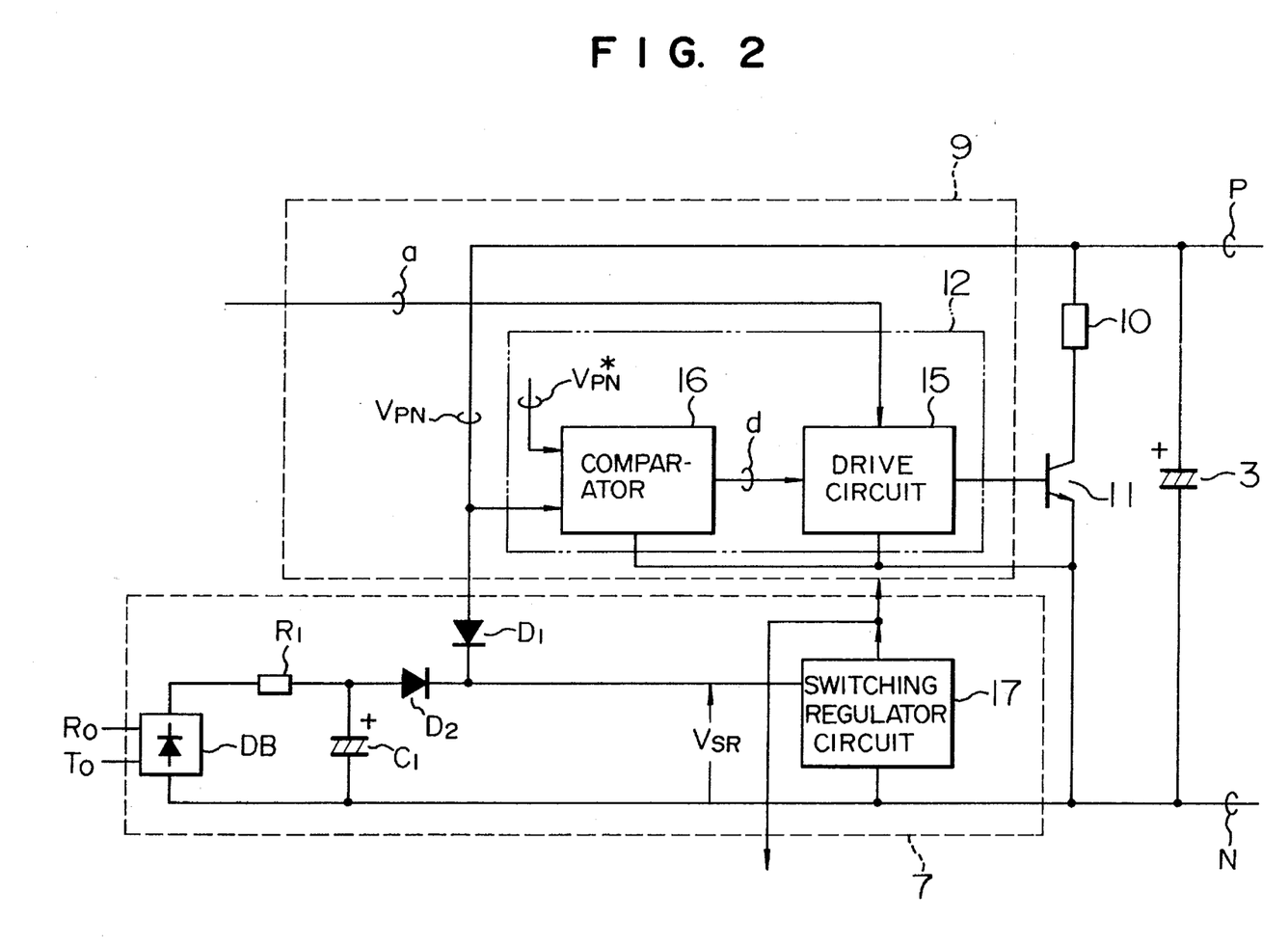
FIG. 2 is a detailed diagram of a discharge control circuit and a power source circuit in FIG. 1.

In the power source circuit 7 shown in FIG. 2, a higher one of the voltage of the smoothing capacitor 3 and the voltage of the capacitor $C_1$ is supplied through a diode $D_1$ or $D_2$ as an input d.c. voltage $V_{SR}$ to the switching regulator circuit 17. When the semiconductor switching element 11 is turned on after the a.c. input power source is turned off, the residual voltage of the smoothing capacitor 3 becomes zero. It is required for the control power source to supply electric power to the whole apparatus under this situation in order to operate the control circuits.

First, when the a.c. control power source (52) connected to $R_0$ and $T_0$ is a separate power source independent of the a.c. input power source connected to R, S and T of the inverter apparatus, electric power is supplied continuously to the switching regulator 17 from the separate power source even if the voltage of the smoothing capacitor 3 disappears, thereby to maintain the voltage of the switching regulator 17 at its normal value. In the case of momentary power stoppage (for several seconds), there is no problem with respect to power supply to the control circuit if a separate power source is connected to $R_0$ and $T_0$ in a manner as above-mentioned.

Figure 5:
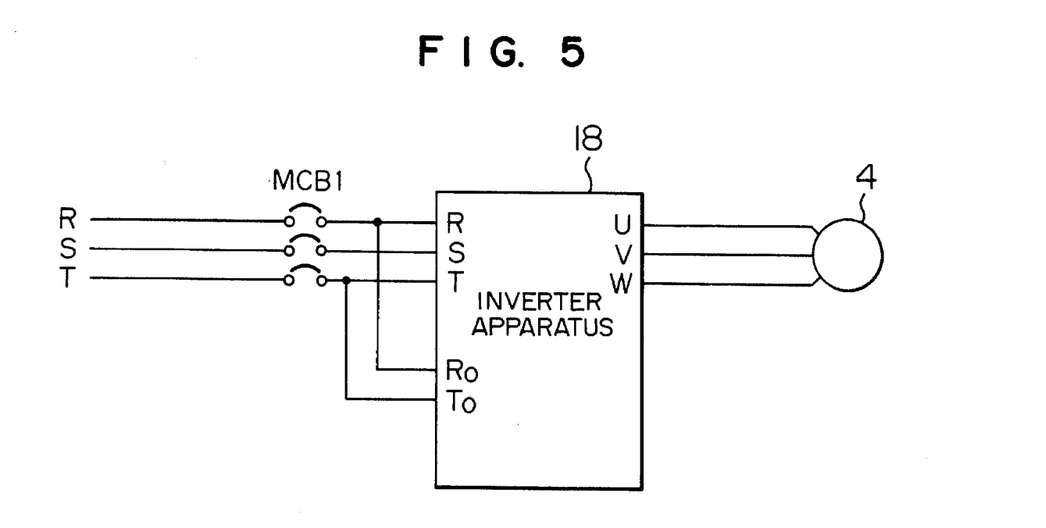
FIG. 5 shows an example of circuit connection of a power source.

Next, when $R_0$ and $T_0$ are connected to any two of R, S and T of the a.c. input power source as shown in FIG. 5, no electric power is inputted from $R_0$ and $T_0$ when the a.c. input power source is cut off. Therefore, means is necessary to maintain the voltage for the switching regulator circuit 17. In this case, the capacity of the capacitor $C_1$ is made large enough to maintain the voltage of the switching regulator circuit 17 even if the energy of the smoothing capacitor 3 is consumed after the a.c. input power source is cut off. Namely, the capacity of the capacitor $C_1$ is determined so that the time interval during which the voltage $V_{SR}$ of the capacitor $C_1$ is substantially held at the normal value is not less than the sum of a time constant Td or the discharge time of the smoothing capacitor 3, determined by the capacitance of the smoothing capacitor 3 and the resistance of the resistor 10, and the allowable duration time of a power stoppage. By this arrangement, there is no problem, because electric power is supplied to the switching regulator 17 from the capacitor C1. As another method of achieving the same effect, the power terminals Ro and To may be connected to a primary side of a breaker MCB through a different breaker.

Figure 6:
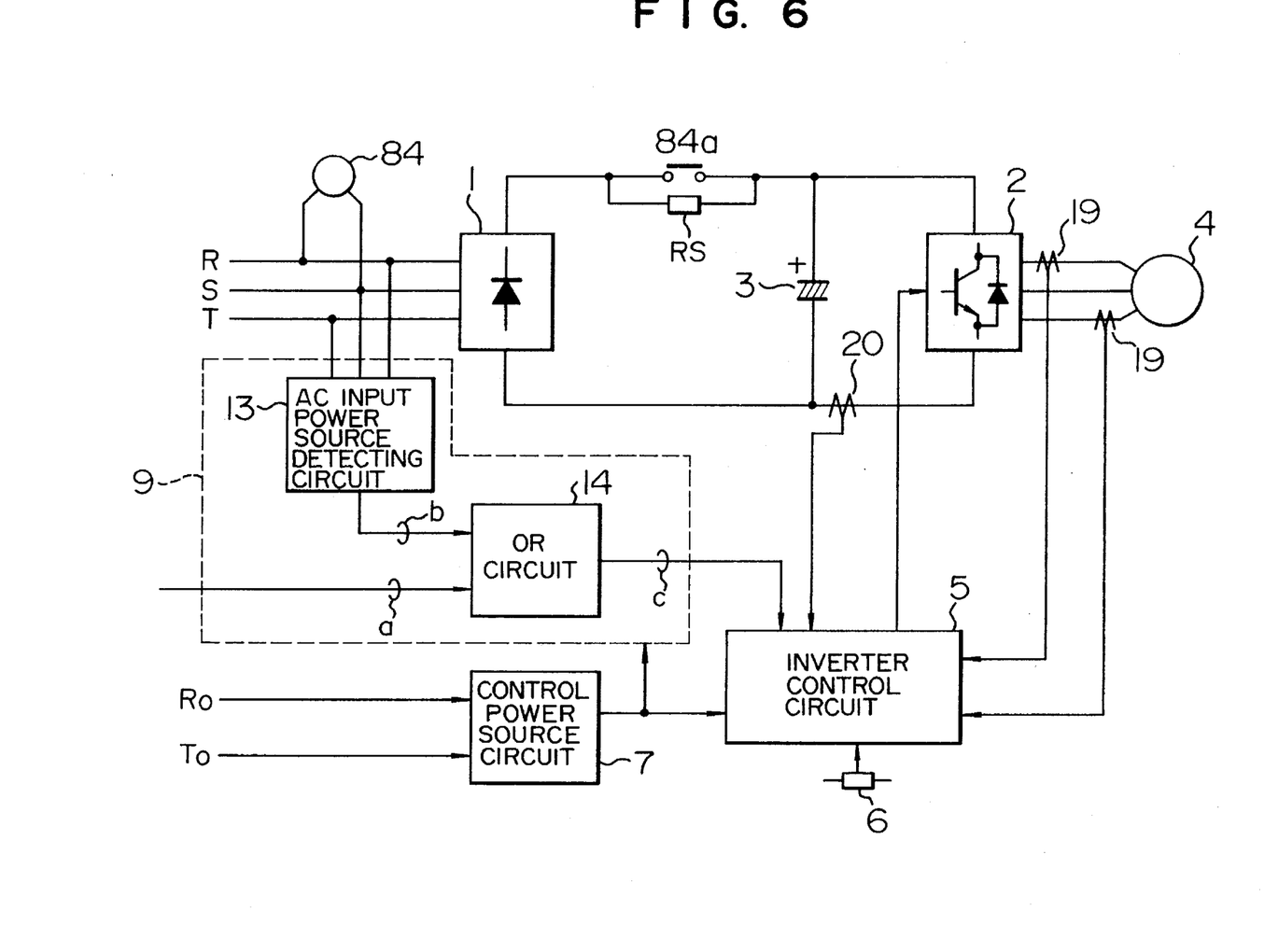
FIG. 6 is a diagram showing still another embodiment of the present invention.
Figure 7:
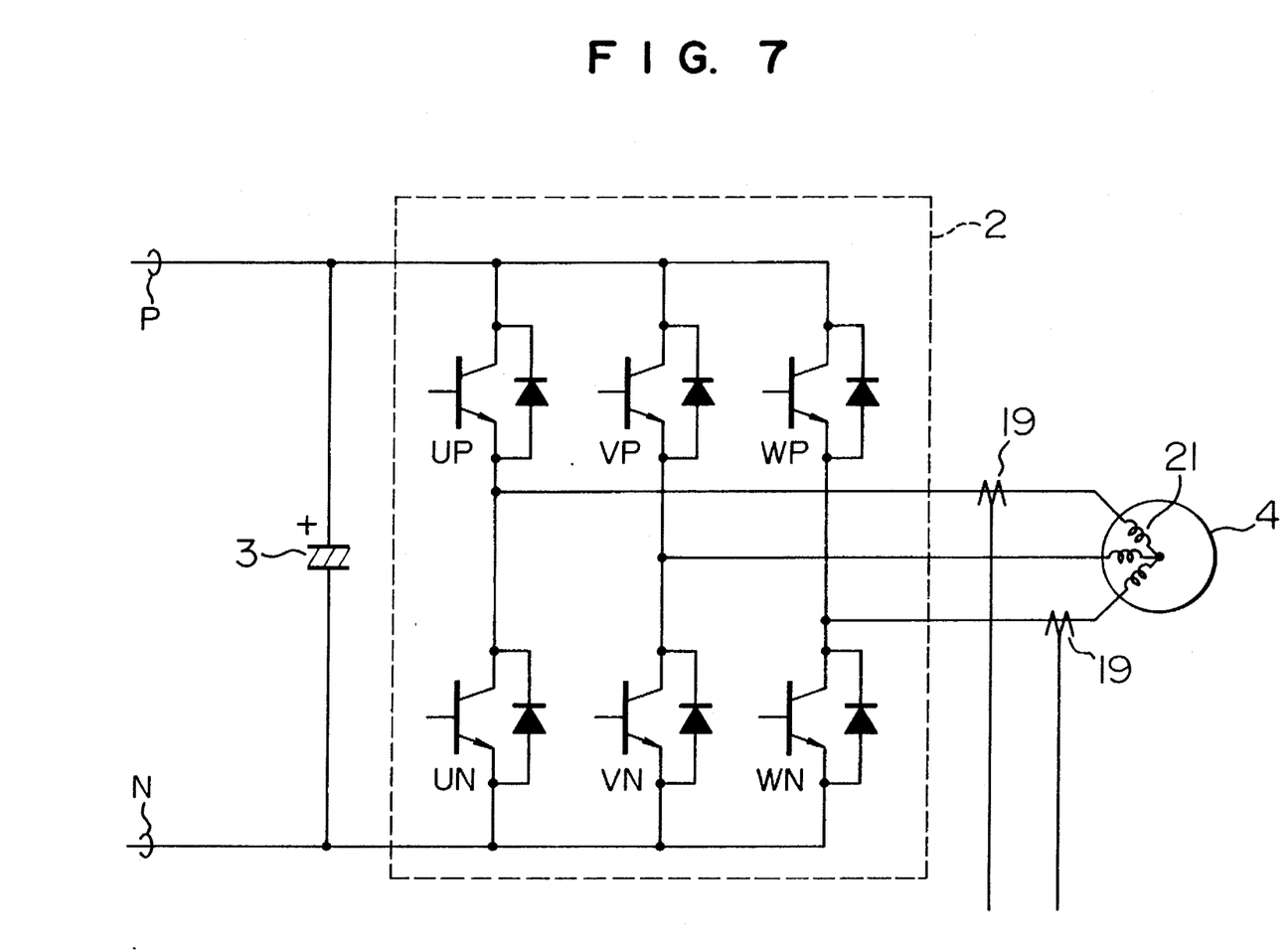
FIG. 7 is a detailed diagram of an inverter.

Furthermore, FIG. 6 and FIG. 7 show another embodiment. The same symbols as those in FIGS. 1 to 3 indicate the same components.

FIGS. 6 and 7 shows an embodiment in which semiconductor switching elements UP, VP, WP, UN, VN and WN of the inverter 2 are utilized in place of the semiconductor switching element 11 shown in FIG. 1, and windings 21 of the a.c. machine are utilized in place of the resistor 10.

FIG. 7 is a detailed diagram of the inverter 2. In this embodiment, the residual voltage of the smoothing capacitor 3 is discharged or consumed as heat energy through the windings 21 of the a.c. machine by controlling ON and OFF switching of a selected two of the switching elements (UN, VN, WN), (UP, VP, WP) of the inverter 2, for example, ON and OFF of UP and VN, thereby maintaining the discharge current at an appropriate value. In this embodiment, the same effects as those of the first-mentioned embodiment are obtained. The discharge current in this case flows in a path from the positive side of the smoothing capacitor 3 to the semiconductor switching element up the windings 21 of the a.c. machine→ the semiconductor switching element VN, and the negative side of the smoothing capacitor 3. Here, it is not necessarily required to use only one of the semiconductor switching elements in each of the upper and lower arms. The element UP in the upper arm and the elements VN and WN in the lower arm, or the elements VP and WP in the upper arm and the element UN in the lower arm may be used for controlling the discharge current. In short, it is sufficient to select suitable elements of the upper and lower arms so that used the discharge current flows through the a.c. machine. Further, it is possible to discharge the smoothing capacitor through the a.c. machine by controlling all the elements (UP to WN) of the inverter in a manner similar to that in switching thereof for usual rotation of the a.c. machine. However, in the above embodiment, only selected elements are ON-OFF controlled in order to prevent a danger that the a.c. machine at rest rotates inadvertently.

As to the power source circuit 7 in this embodiment, it is sufficient either to connect a different power source independent of the input power source to the power terminals Ro and Rs or use a large capacitance of the capacitor $C_1$ in the same way as in the first-mentioned embodiment. In a control mode of the embodiment shown in FIG. 6, the switching of the semiconductor elements of the inverter 2 may be controlled according to a signal of a current detector 19 or 20 so as to maintain the discharge current within a predetermined range.

With this embodiment, there is an advantageous effect that since the semiconductor switching elements of the power inverter and the windings of the motor are utilized, the apparatus can be made small in size, and the number of required components is reduced, thus improving reliability.

Incidentally, the regenerative braking circuit or the switching elements of the inverter and the windings of the a.c. machine are utilized for the discharge circuit in the above-described embodiments. However, it is a matter of course that an independent discharge circuit may be provided for exclusive use therefore.

According to the present invention, there is an advantageous effect that appropriate processing may be performed under a given situation because the residual voltage in the d.c. intermediate circuit is discharged at a desired time after the a.c. input power source of the inverter apparatus is cut off. Moreover, there is an effect that an excessive current will never flow even when momentary power stoppage occurs, thus making it possible to provide a highly reliable inverter apparatus.

What is claimed is:

1. An inverter apparatus comprising:
    a rectifier, having an input adapted to be connected to an a.c. power source for receipt of input a.c. power therefrom, and having an output;
    a d.c. intermediate circuit, including a smoothing capacitor, connected to said output of said rectifier;
    an inverter circuit, having an input connected to said d.c. intermediate circuit, for outputting a.c. electric power for application to an a.c. powered device;
    a series circuit, including a semiconductor switching element and a resistor, said series circuit connected in parallel with said smoothing capacitor; and
    a discharge control circuit, for turning on said semiconductor switching element in response to continuous interruption of the input a.c. power for at least a predetermined time.

2. An inverter apparatus according to claim 1, wherein said series circuit is a discharge circuit for discharging regenerative energy.

3. An inverter apparatus according to claim 1, wherein said predetermined time is determined based on an allowable duration of power interruption of the input a.c. power.

4. An inverter apparatus according to claim 1, wherein said discharge control circuit is further responsive to an externally applied discharge signal to turn on said semiconductor switching element.

5. An inverter apparatus comprising:

a rectifier, having an input adapted to be connected to an a.c. power source for receipt of input a.c. power therefrom, and having an output;

a d.c. intermediate circuit, including a smoothing capacitor, connected to said output of said rectifier;

an inverter circuit, connected to said d.c. intermediate circuit, for outputting a.c. electric power for application to an a.c. powered device;

a series circuit, including a semiconductor switching element and a resistor, said series circuit connected in parallel with said smoothing capacitor; and a discharge control circuit, responsive to continuous interruption of the input a.c. power for at least a predetermined time greater than an allowable duration of power interruption of the input a.c. power, for turning on said semiconductor switching element.

6. An inverter apparatus according to claim 5, wherein said discharge control circuit comprises means for receiving an externally applied first signal, an a.c. input power detecting circuit adapted to be connected to the a.c. power source for producing a second signal following the predetermined time interval, an OR circuit for generating an ON command in response to one of the first signal and the second signal, and a drive circuit responsive to the ON command to turn on said semiconductor switching element.

7. An inverter apparatus according to claim 5, wherein said discharge control circuit includes means responsive to an externally applied discharge signal to turn on said semiconductor switching element.

8. In a variable frequency a.c. power source circuit, including a d.c. intermediate circuit having a smoothing capacitor, a method of controlling discharge of electric charge on said smoothing capacitor, said method comprising the steps of:

monitoring whether an interruption of voltage from the a.c. power source has continued for at least a predetermined time interval greater than an allowable duration of momentary power interruption of the a.c. power source; and when the interruption has continued for at least said predetermined time interval, producing a signal to activate means for discharging the electric charge on said smoothing capacitor.

9. An inverter apparatus comprising:

a rectifier having an input adapted to be connected to an a.c. power source for receipt of input a.c. power therefrom, a rectifying circuit for rectifying the received a.c. power to provide d.c. power, and an output for outputting the d.c. power;

a d.c. intermediate circuit connected to said output of said rectifier, and including a smoothing capacitor for smoothing the d.c. power;

an inverter circuit having an input connected to said d.c. intermediate circuit for receipt of the smoothed d.c. power therefrom, semiconductor switches for inverting the smoothed d.c. power to provide output a.c. power, and an output for outputting the output a.c. power for application to a resistor in an a.c. powered device; and a discharge control circuit for turning on said semiconductor switching element in response to continuous interruption of the input a.c. power for at least a predetermined time, to discharge said smoothing capacitor.

* * * * *